United States Patent
Bae et al.

(10) Patent No.: US 9,910,059 B2
(45) Date of Patent: Mar. 6, 2018

(54) METHOD AND SYSTEM FOR ANALYZING MOTION OF SUBJECT USING EVENT-BASED SENSOR

(71) Applicant: SAMSUNG ELECTRONICS CO., LTD., Suwon-si, Gyeonggi-Do (KR)

(72) Inventors: Kwang-Hyuk Bae, Seoul (KR); Kyu-Min Kyung, Seoul (KR); Tae-Chan Kim, Yongin-si (KR); Seong-Yeong Jeong, Daegu (KR); Shung-Han Cho, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 632 days.

(21) Appl. No.: 14/534,199

(22) Filed: Nov. 6, 2014

(65) Prior Publication Data
US 2015/0192408 A1 Jul. 9, 2015

(30) Foreign Application Priority Data
Jan. 7, 2014 (KR) .................. 10-2014-0001656

(51) Int. Cl.
*G06F 19/00* (2011.01)
*G01P 13/04* (2006.01)

(52) U.S. Cl.
CPC .................. *G01P 13/045* (2013.01)

(58) Field of Classification Search
CPC .... G06T 19/006; G06Q 50/24; A63F 2300/69
USPC .................. 702/160, 150–155, 182–185
See application file for complete search history.

(56) References Cited

U.S. PATENT DOCUMENTS

| | | | |
|---|---|---|---|
| 7,602,946 B2 | 10/2009 | Watanabe | |
| 7,925,054 B2 | 4/2011 | Ishii | |
| 8,094,936 B2 | 1/2012 | Woo et al. | |
| 2007/0171202 A1 | 7/2007 | Yang et al. | |
| 2009/0208111 A1 | 8/2009 | Jeong et al. | |
| 2012/0061568 A1 | 3/2012 | Lee et al. | |
| 2012/0122574 A1* | 5/2012 | Fitzpatrick | G06T 13/40 463/31 |
| 2012/0257789 A1 | 10/2012 | Lee et al. | |

FOREIGN PATENT DOCUMENTS

| | | |
|---|---|---|
| JP | 2011307107 | 11/2001 |
| JP | 2006279464 | 10/2006 |
| KR | 1020120082201 A | 7/2012 |
| KR | 12148588 B | 12/2012 |
| KR | 1020130040517 A | 4/2013 |

* cited by examiner

*Primary Examiner* — Edward Raymond
(74) *Attorney, Agent, or Firm* — Volentine & Whitt, PLLC

(57) ABSTRACT

A method is provided for analyzing motion of a subject. The method includes receiving multiple events from an event-based sensor, the events corresponding to a luminance change of the subject; calculating velocities of the events and directions of the events; generating a motion analysis table comprising an X axis classified into multiple velocity sections, a Y axis classified into multiple direction sections, and multiple cells representing frequencies of events corresponding to combinations of the velocity sections and the direction sections; and determining a motion of the subject based on the motion analysis table.

20 Claims, 8 Drawing Sheets

| | Direction section 1 (D₁) | Direction section 2 (D₂) | ... | Direction section M (D_M) |
|---|---|---|---|---|
| Velocity section 1 (V₁) | C₁₁ % | C₂₁ % | ... | C_M1 % |
| Velocity section 2 (V₂) | C₁₂ % | C₂₂ % | ... | C_M2 % |
| Velocity section 3 (V₃) | C₁₃ % | C₂₃ % | ... | C_M3 % |
| ... | ... | ... | ⋰ | ... |
| Velocity section N (V_N) | C₁N % | C₂N % | ... | C_MN % |

METHOD AND SYSTEM FOR ANALYZING MOTION OF SUBJECT USING EVENT-BASED SENSOR

CROSS-REFERENCE TO RELATED APPLICATION

A claim for priority under 35 U.S.C. § 119 is made to Korean Patent Application 10-2014-0001656, filed on Jan. 7, 2014, in the Korean Intellectual Property Office (KIPO), the entire contents of which are hereby incorporated by reference.

BACKGROUND

Exemplary embodiments relate generally to motion analysis, and more particularly to a method of analyzing motion of a subject using an event-based sensor.

An event-based sensor (EBS) is a type of image sensor that generates events corresponding to a luminance change of a subject. Conventional methods of analyzing motion of the subject using an EBS may not recognize motion of the subject sufficiently in an outdoor environment, for example, with huge luminance changes.

SUMMARY

Exemplary embodiments of the inventive concept provide methods and systems for analyzing motion of a subject using an event-based sensor.

According to an exemplary embodiment, a method is provided for analyzing motion of a subject. The method includes receiving multiple events from an event-based sensor, the events corresponding to a luminance change of the subject; calculating velocities of the events and directions of the events; generating a motion analysis table having an X axis classified into multiple velocity sections, a Y axis classified into multiple direction sections, and multiple cells representing frequencies of events corresponding to combinations of the velocity sections and the direction sections; and determining a motion of the subject based on the motion analysis table.

Determining the motion of the subject based on the motion analysis table may include determining a motion direction of the subject as a representative direction of a direction section of a first cell, which has a highest frequency in the motion analysis table, based on a frame average velocity and the motion analysis table.

Determining the motion direction of the subject as the representative direction of the direction section of the first cell based on the frame average velocity and the motion analysis table may be performed when a frequency of the first cell is greater than a critical frequency of the motion analysis table, and the frequency of the first cell is greater than a product of a majority baseline ratio and one of a first frequency and a second frequency. The first frequency is a frequency of a second cell having a lowest frequency among cells corresponding to a velocity section of the first cell in the motion analysis table, and the second frequency is a frequency of a third cell having an opposite direction to a direction of the first cell among cells which correspond to the velocity section of the first cell in the motion analysis table.

Determining the motion of the subject based on the motion analysis table may include determining a motion velocity of the subject based on a frame average velocity and the motion analysis table.

Determining the motion velocity of the subject based on the frame average velocity and the motion analysis table may determine the motion velocity of the subject as a first normal motion velocity in a first case in which the frame average velocity is greater than a lower boundary velocity of a normal motion, a frequency of a first cell, which has a highest frequency in the motion analysis table, is greater than a first critical frequency of the motion analysis table, and the frequency of the first cell is greater than a product of a first majority baseline ratio and one of a first frequency and a second frequency. The first frequency is a frequency of a second cell having a lowest frequency among cells which correspond to a velocity section of the first cell in the motion analysis table, and the second frequency is a frequency of a third cell having an opposite direction to a direction of the first cell among cells which correspond to the velocity section of the first cell in the motion analysis table.

Determining the motion velocity of the subject based on the frame average velocity and the motion analysis table may determine the motion velocity of the subject as a second normal motion velocity in a second case, in which the frame average velocity is less than the lower boundary velocity of the normal motion, the frequency of the first cell is greater than a second critical frequency of the motion analysis table, and the frequency of the first cell is greater than a product of a second majority baseline ratio and one of the first frequency and the second frequency.

Determining the motion velocity of the subject based on the frame average velocity and the motion analysis table may determine the motion velocity of the subject to be 0 and that the subject is background in a case other than one of the first and second cases.

Determining the motion velocity of the subject based on the frame velocity and the motion analysis table may include adjusting intervals of the velocity sections of the motion analysis table when a frame average velocity is less than a lower boundary velocity of a normal motion, a frequency of a first cell is greater than a critical frequency of the motion analysis table, and the frequency of the first cell is less than a product of a majority baseline ratio and one of a first frequency and a second frequency. The first cell has a highest frequency in the motion analysis table. The first frequency is a frequency of a second cell having a lowest frequency among cells which correspond to a velocity section of the first cell in the motion analysis table, and the second frequency is a frequency of a third cell having an opposite direction to a direction of the first cell among cells which correspond to the velocity section of the first cell in the motion analysis table.

Adjusting the intervals of the velocity sections of the motion analysis table may adjust a portion of the intervals of the velocity sections of the motion analysis table. Or, adjusting the intervals of the velocity sections of the motion analysis table may adjust all of the intervals of the velocity sections of the motion analysis table.

Generating the motion analysis table and determining the motion of the subject based on the motion analysis tables may be performed again after adjusting the intervals of the velocity sections of the motion analysis table.

Each of the events may includes coordinate information, time information, and polarity information. The polarity information may be one of positive polarity information and negative polarity information.

Calculating the velocities of the events and the directions of the events may include calculating a velocity of a first event and a direction of the first event based on the first event and a second event, the first event being generated by an event sensing unit corresponding to a first pixel and the second event being generated by another event sensing unit corresponding to a second pixel located around the first pixel. The second pixel may be located within a window including the first pixel and N pixels located around the first pixel.

According to another exemplary embodiment, a subject motion analyzer system includes an event-based sensor, a motion analysis table (MAT) generating unit, and a motion analyzing unit. The event-based sensor is configured to generate multiple events corresponding to luminance changes of a subject. The MAT generating unit is configured to calculate velocities and directions of the events, and to generate a motion analysis table including an X axis classified into multiple velocity sections, a Y axis classified into multiple direction sections, and multiple cells representing frequencies of events corresponding to combinations of the velocity sections and the direction sections. The motion analyzing unit is configured to determine a motion of the subject based on the motion analysis table MAT.

The system may further include a memory device configured to store the motion analysis table generated by the MAT generating unit. The motion analyzing unit may load the motion analysis table from the memory device for determining the motion of the subject.

The frequency of each cell in the motion analysis table is a ratio of the number of all events and the number of events having a velocity within the velocity section corresponding to the cell and a direction within the direction section corresponding to the cell.

The motion analyzing unit may determine a motion direction of the subject by determining a motion direction of the subject as a representative direction of a direction section of a first cell based on a frame average velocity and the motion analysis table. The first cell has a highest frequency among the cells in the motion analysis table.

The motion analyzing unit may determine a motion velocity of the subject based on comparison of a frame average velocity with a lower boundary velocity, comparison of the frequency of the first cell with one of a first or second critical frequency, and comparison of the frequency of the first cell with a product of a majority baseline ratio and one of a first frequency and a second frequency. The first frequency is a frequency of a second cell having a lowest frequency among cells corresponding to a velocity section of the first cell in the motion analysis table, and the second frequency is a frequency of a third cell having an opposite direction to a direction of the first cell among cells which correspond to the velocity section of the first cell in the motion analysis table.

As described above, a method and system of analyzing motion of a subject may recognize the subject and a background using a motion analysis table with a reduced error, and may determine a motion direction and a motion velocity of the subject.

BRIEF DESCRIPTION OF THE DRAWINGS

Exemplary embodiments of the inventive concept will be more clearly understood from the following description taken in conjunction with the accompanying drawings.

DETAILED DESCRIPTION OF THE EMBODIMENTS

Embodiments will be described in particular with reference to the following description and accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to one of ordinary skill in the art. Accordingly, known processes, elements, and techniques are not described with respect to some of the embodiments. Unless otherwise noted, like reference numerals denote like elements throughout the attached drawings and written description, and thus descriptions may not be repeated. In the drawings, sizes and relative sizes of layers and regions may be exaggerated for clarity.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular exemplary embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" refers to an example or illustration.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
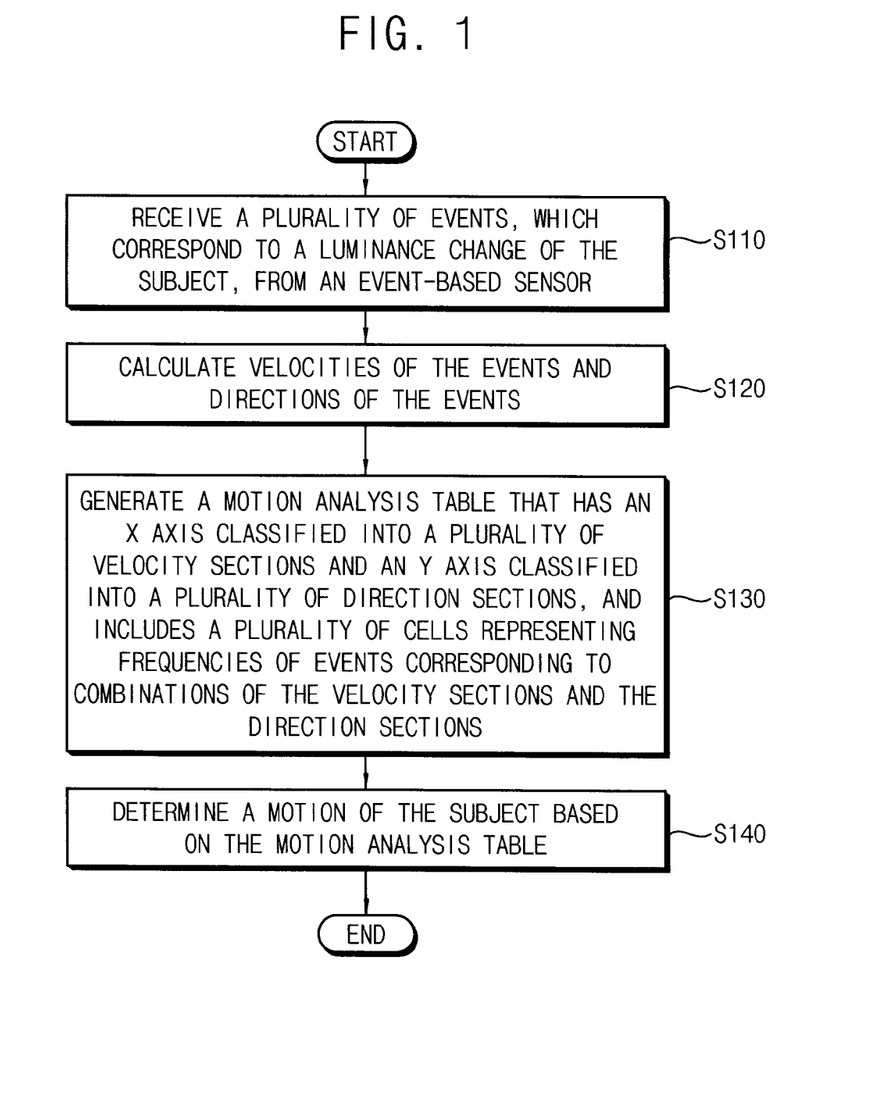
FIG. 1 is a flow chart illustrating a method of analyzing motion of a subject, according to an exemplary embodiment.

FIG. 1 is a flow chart illustrating a method of analyzing motion of a subject, according to an exemplary embodiment.

Referring to FIG. 1, to analyze motion of the subject, multiple events, which correspond to a luminance change of the subject, are received from an event-based sensor in step S110. The events will be described below with reference to FIG. 3.

Velocities of the events and directions of the events are calculated in step S120. Calculating the velocities of the events and the directions of the events (S120) will be described below with reference to FIG. 4.

A motion analysis table is generated in step S130. The motion analysis table has an X axis classified into velocity sections and a Y axis classified into direction sections, and includes multiple cells representing frequencies of events corresponding to combinations of the velocity sections and the direction sections. The motion analysis table will be described below with reference to FIG. 5.

A motion of the subject is determined based on the motion analysis table in step S140. Determining the motion of the subject based on the motion analysis table will be described below with reference to FIG. 6.

Figure 2:
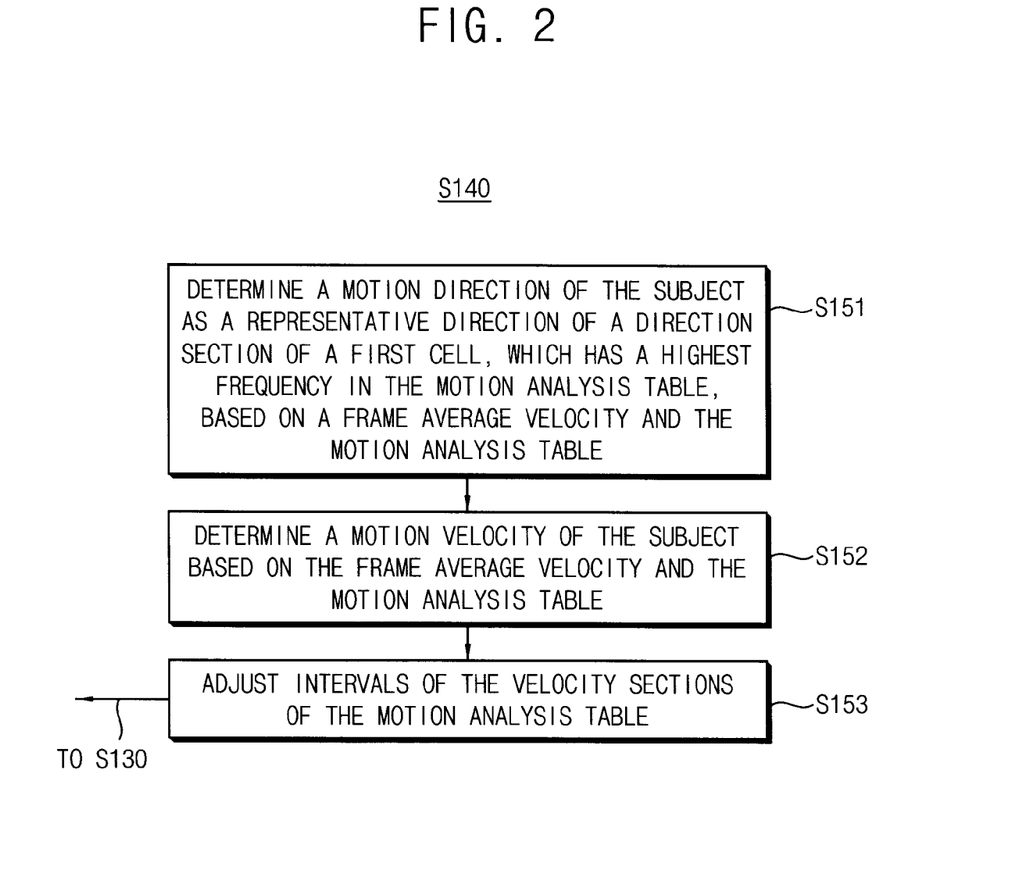
FIG. 2 is a flow chart illustrating determining motion of the subject based on a motion analysis table included in the flow chart of FIG. 1, according to an exemplary embodiment.

FIG. 2 is a flow chart illustrating determining the motion of the subject based on the motion analysis table included in step S140 in the flow chart of FIG. 1, according to a representative embodiment.

Referring to FIG. 2, in the depicted embodiment, determining the motion of the subject based on the motion analysis table includes determining a motion direction of the subject as a representative direction of a direction section of a first cell based on a frame average velocity and the motion analysis table in step S151. The first cell is the cell in the motion analysis table having a highest frequency. In step S152, a motion velocity of the subject is determined based on the frame average velocity and the motion analysis table. In step S153, intervals of the velocity sections of the motion analysis table are adjusted based on various criteria, such as when the frame average velocity is less than a lower boundary velocity of a normal motion, a frequency of the first cell is greater than a critical frequency of the motion analysis table, the frequency of the first cell is less than a product of a majority baseline ratio and a first frequency, or frequency of the first cell is less than a product of the majority baseline ratio and a second frequency. The first frequency may be a frequency of a second cell having a lowest frequency among cells which correspond to a velocity section of the first cell in the motion analysis table. The second frequency may be a frequency of a third cell having an opposite direction to a direction of the first cell among cells which correspond to the velocity section of the first cell in the motion analysis table.

Generating the motion analysis table (S130) and determining the motion of the subject based on the motion analysis tables (S140) may be performed again (TO S130) after adjusting the intervals of the velocity sections of the motion analysis table (S153).

Determining the motion direction of the subject as the representative direction of the direction section of the first cell based on the frame average velocity and the motion analysis table (S151), determining the motion velocity of the subject based on the frame average velocity and the motion analysis table (S152), and adjusting the intervals of the velocity sections of the motion analysis table (S153) will be described below with the reference to FIG. 6.

Figure 3:
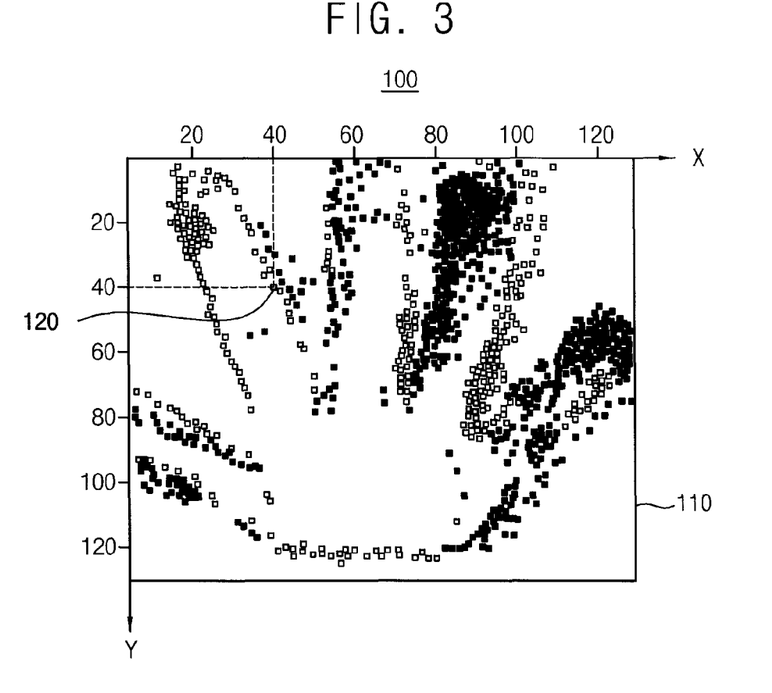
FIG. 3. is a diagram illustrating coordination information, time information, and polarity information of events, according to an exemplary embodiment.

FIG. 3. is diagram illustrating coordination information, time information, and polarity information of events, according to a representative embodiment.

Referring to FIG. 3, diagram 100 illustrates coordinate information of events and polarity information of the events. The events correspond to luminance change of a subject (a hand of a human). An event-based sensor (EBS) may generate the events.

As mentioned above, the event-based sensor is a type of image sensor. The event-based sensor senses luminance changes of the subject, and outputs events corresponding to the luminance changes of the subject. The subject may be a human, an animal, or a moving thing, for example. Each of the events includes coordinate information, time information, and polarity information.

The event-based sensor includes multiple event sensing units, which are allocated to pixels included in a pixel frame 110, respectively. When the intensity of the incident light to the event sensing unit is increased, coordinate information (X-coordinate, Y-coordinate) of a pixel corresponding to the event sensing unit, time information, and positive polarity information may be generated. When the intensity of the incident light to the event sensing unit is decreased, coordinate information of the pixel corresponding to the event sensing unit, time information, and negative polarity information may be generated. For example, a representative event generated by an event sensing unit corresponding to a first pixel 120 may include an X-coordinate value of 40, a Y-coordinate value of 40, and positive polarity information. The event sensing unit generates events having positive polarity information when the level of the intensity of the incident light to the event sensing unit changes to a larger value than a first setting value. The event sensing unit generates events having negative polarity information when the level of the intensity of the incident light to the event sensing unit is less than a second setting value.

In the example shown in FIG. 3, an event depicted as a white spot is generated when the intensity of the incident light to an event sensing unit corresponding to a pixel is increased. An event depicted as a black spot in FIG. 3 is generated when the intensity of the incident light to another event sensing unit corresponding to another pixel is decreased.

Figure 4:
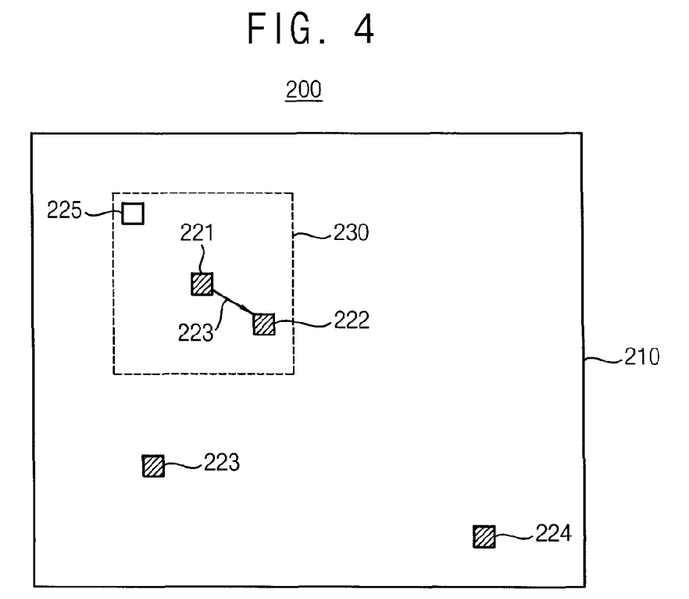
FIG. 4 is a diagram illustrating calculating velocities of the events and directions of the events included in the flow chart of FIG. 1 according to an exemplary embodiment.

FIG. 4 is a diagram 200 illustrating calculating the velocities of the events and the directions of the events included in the flow chart of FIG. 1, according to an exemplary embodiment.

Referring to FIG. 4, a pixel frame 210 includes a first pixel 221, a second pixel 222, a third pixel 223, and a fourth pixel 224, and a fifth pixel 225. A first window 230 in the pixel frame 210 includes the first pixel 221, the second pixel 222, and the fifth pixel 225, for example.

A first event generated by an event sensing unit corresponding to the first pixel 221 includes information (X1, Y1, T1, 0). That is, (X1, Y1) are the coordinates of the pixel in which the first event is generated by the event sensing unit; (T1) indicates generation of the first event; and (0) indicates negative polarity information of the first event. Similarly, a second event generated by an event sensing unit corresponding to the second pixel 222 includes information (X2, Y2, T2, 0). A third event generated by an event sensing unit corresponding to the third pixel 223 includes information (X3, Y3, T3, 0). A fourth event generated by an event sensing unit corresponding to the fourth pixel 224 includes information (X4, Y4, T4, 0). The second, third and fourth events may be understood based on the above description of the information regarding the first event.

A fifth event generated by an event sensing unit corresponding to the fifth pixel 225 includes information of (X5, Y5, T5, 1). That is, (X5, Y5) are the coordinates of the pixel in which the fifth event is generated by the event sensing unit; (T5) indicates generation of the fifth event; and (1) indicates positive polarity information of the fifth event.

Calculating the velocities and the directions of the events (S120) included in the flow chart of FIG. 1 may be based on information of events that are generated within a certain event period (T0~TMAX). The first event is generated within event period (T0<T1<TMAX). The second event is generated within event period (T0<T2<TMAX). The third event is generated within event period (T0<T3<TMAX). The fourth event is generated within event period (T0<T4<TMAX). The fifth event is generated within the event period (T0<T5<TMAX).

Identity of subjects of the events may be determined in the events within a window describing a maximum moving boundary of the events during the certain event period (T0~TMAX) in the pixel frame 210, for example. The first window 230, which has the first pixel 221 at the center, describes a maximum moving boundary of the first event, which is generated by the event sensing unit corresponding to the first pixel 221, during the certain event period (T0~TMAX). The subject of the first event, the subject of the second event, and the subject of the fifth event may be the same because the pixels corresponding to event sensing units generating the first, second, and fifth events, respectively, are within the first window 230. The subject of the first event and the subject of the third event may not be the same because the pixel corresponding to the event sensing unit generating the third event is not within the first window 230.

When a window includes a two pixels, and one of the two events generated by the event sensing units corresponding to the two pixels has negative polarity information and the other of the two events has positive polarity information, it is not necessary to calculate velocity and direction between the two events because the subjects of the two events can not be the same. For example, the first pixel 221, which corresponds to the event sensing unit generating the first event, and the fifth pixel 225, which corresponds to the event sensing unit generating the fifth event, are within the first window 230. However, because the first event includes negative polarity information and the fifth event includes positive polarity information, it is not necessary to calculate velocity and direction between the first and fifth events.

When the subject of the first event and the subject of the second event are the same, a direction of the first event's motion 223 may be described as (X2−X1, Y2−Y1) and a velocity of the first event's motion 223 may be described by Equation 1 (where T1<T2):

$$v = \frac{\sqrt{(X_2 - X_1)^2 + (Y_2 - Y_1)^2}}{T_2 - T_1} \quad \text{[Equation 1]}$$

The first window 230 exists around the first pixel 221 corresponding to the event sensing unit generating the first event. In the same way, a second window (not shown) may exist around the second pixel 222 corresponding to the event sensing unit generating the second event, a third window (not shown) may exist around the third pixel 223 corresponding to the event sensing unit generating the third event, a fourth window (not shown) may exist around the fourth pixel 224 corresponding to the event sensing unit generating the fourth event, and a fifth window (not shown) may exist around the fifth pixel 225 corresponding to the event sensing unit generating the fifth event. The method of calculating directions and velocities of the second through fifth events may be understood based on the above description of calculating direction and velocity of the first event.

In an exemplary embodiment, a window includes N+1 pixels. For example, the first window 230 in FIG. 4 includes the first pixel 221, plus N more pixels, where N is a natural number. The shape of the first window 230 may be a square, for example so that the first window 230 may be composed of 9, 25 or 49 pixels. N may be 8, 24 or 48 so that the first pixel 221 is located at the center of the first window 230.

Events having the same subject as the subject of the first event, which is generated by the event sensing unit corresponding to the first pixel, is determined by an N-neighborhood pixel processing method. The N-neighborhood pixel processing method also determines the velocity and the direction between the events having the same subject as the first event. In a conventional method, a substantial amount of computational power is necessary to calculate all velocities and directions among all events generated by all event sensing units, e.g., corresponding to the pixel frame 210. The N-neighborhood pixel processing method of the present embodiment requires lower computational power than the conventional method.

Figure 5:
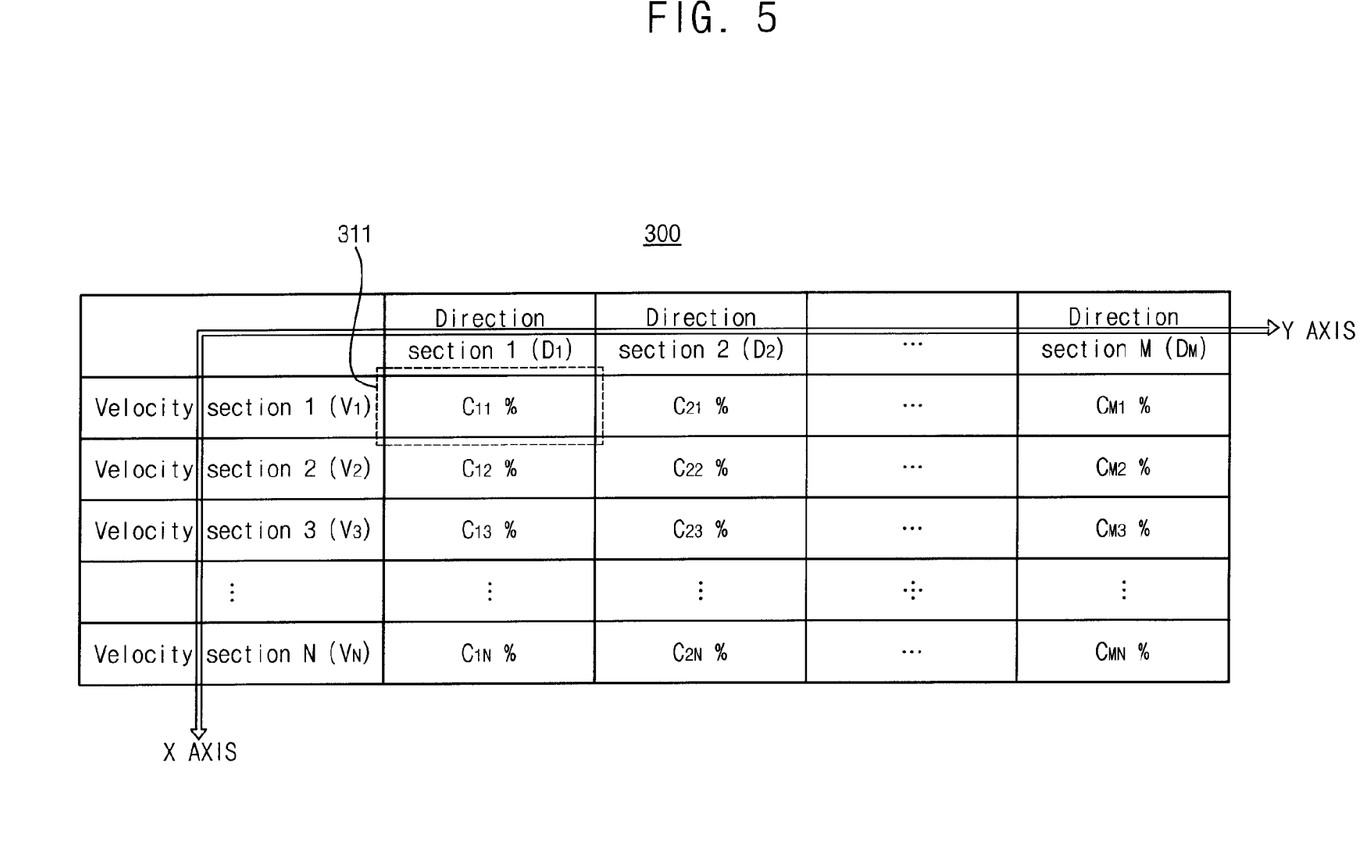
FIG. 5 is a diagram illustrating a motion analysis table, according to an exemplary embodiment.

FIG. 5 is a table illustrating motion analysis, according to an exemplary embodiment.

Referring to FIG. 5, an X axis of a motion analysis table 300 is classified into velocity sections V1 through VN. A Y axis of the motion analysis table 300 is classified into velocity sections D1 through DM. The motion analysis table 300 includes multiple cells, which correspond to combinations of the velocity sections V1 through VN and the direction sections D1 through DM, respectively.

For example, when M is equal to 12, the motion analysis table 300 includes the first direction section D1 through the twelfth direction section (D12) as the direction sections. In this example, the first direction section D1 includes a direction which is greater than or equal to 0 degrees, and less than 30 degrees. The second direction section D2 includes a direction which is greater than or equal to 30 degrees, and less 60 degrees. The third direction section (D3) includes a direction which is greater than or equal to 60 degrees, and less than 90 degrees. The fourth direction section (D4) includes a direction which is greater than or equal to 90 degrees, and less than 120 degrees. The fifth direction section (D5) includes a direction which is greater than or equal to 120 degrees, and less than 150 degrees. The sixth direction section (D6) includes a direction which is greater than or equal to 150 degrees, and less than 180 degrees. The seventh direction section (D7) includes a direction which is greater than or equal to 180 degrees, and less than 210 degrees. The eighth direction section (D8) includes a direction which is greater than or equal to 210 degrees, and less than 240 degrees. The ninth direction section (D9) includes a direction which is greater than or equal to 240 degrees, and less than 270 degrees. The tenth direction section (D10) includes a direction which is greater than or equal to 270 degrees, and less than 300 degrees. The eleventh direction section (D11) includes a direction which is greater than or equal to 300 degrees, and less than 330 degrees. The twelfth direction section (D12) includes a direction which is greater than or equal to 330 degrees, and less than 360 degrees (0 degrees).

Also, for example, when N is 10 and a moving limit velocity of an event is VMAX pixels per second (pps), the motion analysis table 300 includes a first velocity section V1 through a tenth velocity section V10 as the velocity sections. The first velocity section V1 includes a velocity which is greater than or equal to 0 pps, and less than 0.1*VMAX pps. The second velocity section V2 includes a velocity which is greater than or equal to 0.1*VMAX pps, and is less than 0.2*VMAX pps. The third velocity section V3 includes a velocity which is greater than or equal to 0.2*VMAX pps, and is less than 0.3*VMAX pps. The fourth velocity section (V4) includes a velocity which is greater than or equal to 0.3*VMAX pps, and is less than 0.4*VMAX pps. The fifth velocity section (V5) includes a velocity which is greater than or equal to 0.4*VMAX pps, and is less than 0.5*VMAX pps. The sixth velocity section (V6) includes a velocity which is greater than or equal to 0.5*VMAX pps, and is less than 0.6*VMAX pps. The seventh velocity section (V7) includes a velocity which is greater than or equal to 0.6*VMAX pps, and is less than 0.7*VMAX pps. The eighth velocity section (V8) includes a velocity which is greater than or equal to 0.7*VMAX pps, and is less than 0.8*VMAX pps. The ninth velocity section (V9) includes a velocity which is greater than or equal to 0.8*VMAX pps, and is less than 0.9*VMAX pps. The tenth velocity section (V10) includes a velocity which is greater than or equal to 0.9*VMAX pps, and is less than VMAX pps. In various embodiments, intervals of the velocity sections V1, V2, V3, through V10 may be the same as or different from on another other.

In the exemplary motion analysis table 300, a cell 311 corresponding to a combination of the first velocity section V1 and the first direction section D1 includes a first frequency C11. The first frequency C11 is a ratio of the number of all events, and the number of events having a velocity within the first velocity section V1 and a direction within the first direction section D1. Similarly, in the motion analysis table 300, a cell corresponding to a combination of the first velocity section V1 and the second direction section D2 includes a second frequency C21, which is a ratio of the number of all events, and the number of events having a velocity within the first velocity section V1 and a direction within the second direction section D2. In the motion analysis table 300, a cell corresponding to a combination of the first velocity section V1 and the (M)-th direction section DM includes a third frequency CM1, which is a ratio of the number of all events, and the number of events having a velocity within the first velocity section V1 and a direction within the (M)-th direction section DM.

In the motion analysis table 300, a cell corresponding to a combination of the second velocity section V2 and the first direction section D1 includes a fourth frequency C12. The fourth frequency C12 is a ratio of the number of all events, and the number of events having a velocity within the second velocity section V2 and a direction within the first direction section D1. Similarly, in the motion analysis table 300, a cell corresponding to a combination of the second velocity section V2 and the second direction section D2 includes a fifth frequency C22, which is a ratio of the number of all events, and the number of events having a velocity within the second velocity section V2 and a direction within the second direction section D2. In the motion analysis table 300, a cell corresponding to a combination of the second velocity section V2 and the (M)-th direction section DM includes a sixth frequency CM2, which is a ratio of the number of all events, and the number of events having a velocity within the second velocity section V2 and a direction within the (M)-th direction section DM.

In the motion analysis table 300, a cell corresponding to a combination of the third velocity section V3 and the first direction section D1 includes a seventh frequency C13. The seventh frequency C13 is a ratio of the number of all events, and the number of events having a velocity within the third velocity section V3 and a direction within the first direction section D1. In the motion analysis table 300, a cell corresponding to a combination of the third velocity section V3 and the second direction section D2 includes an eighth frequency C23, which is a ratio of the number of all events, and the number of events having a velocity within the third velocity section V3 and have a direction within the second direction section D2. In the motion analysis table 300, a cell corresponding to a combination of the third velocity section V3 and the (M)-th direction section DM includes a ninth frequency CM3, which is a ratio of the number of all events, and the number of events having a velocity within the third velocity section V3 and a direction within the (M)-th direction section DM.

In the motion analysis table 300, a cell corresponding to a combination of the (N)-th velocity section VN and the first direction section D1 includes a tenth frequency C1N. The tenth frequency C1N is a ratio of the number of all events, and the number of events having a velocity within the (N)-th velocity section VN and a direction within the first direction section D1. In the motion analysis table 300, a cell corresponding to a combination of the (N)-th velocity section VN and the second direction section D2 includes a eleventh frequency C2N, which is a ratio of the number of all events, and the number of events having a velocity within the (N)-th velocity section VN and a direction within the second direction section D2. In the motion analysis table 300, a cell corresponding to a combination of the (N)-th velocity section VN and the (M)-th direction section DM includes a twelfth frequency CMN, which is a ratio of the number of all events, and the number of events having a velocity within the (N)-th velocity section VN and a direction within the (M)-th direction section DM.

The contents of the other cells included in the motion analysis table 300 are determined in the same matter as described above. Thus, the description of the other cells is omitted.

In an exemplary embodiment, adjusting the intervals of the velocity sections of the motion analysis table (S153) may include adjusting a portion of the intervals of the velocity sections V1 through VN of the motion analysis table 300. In an alternative exemplary embodiment, adjusting the intervals of the velocity sections of the motion analysis table (S153) may include adjusting all of the intervals of the velocity sections V1 through VN of the motion analysis table 300.

Figure 6:
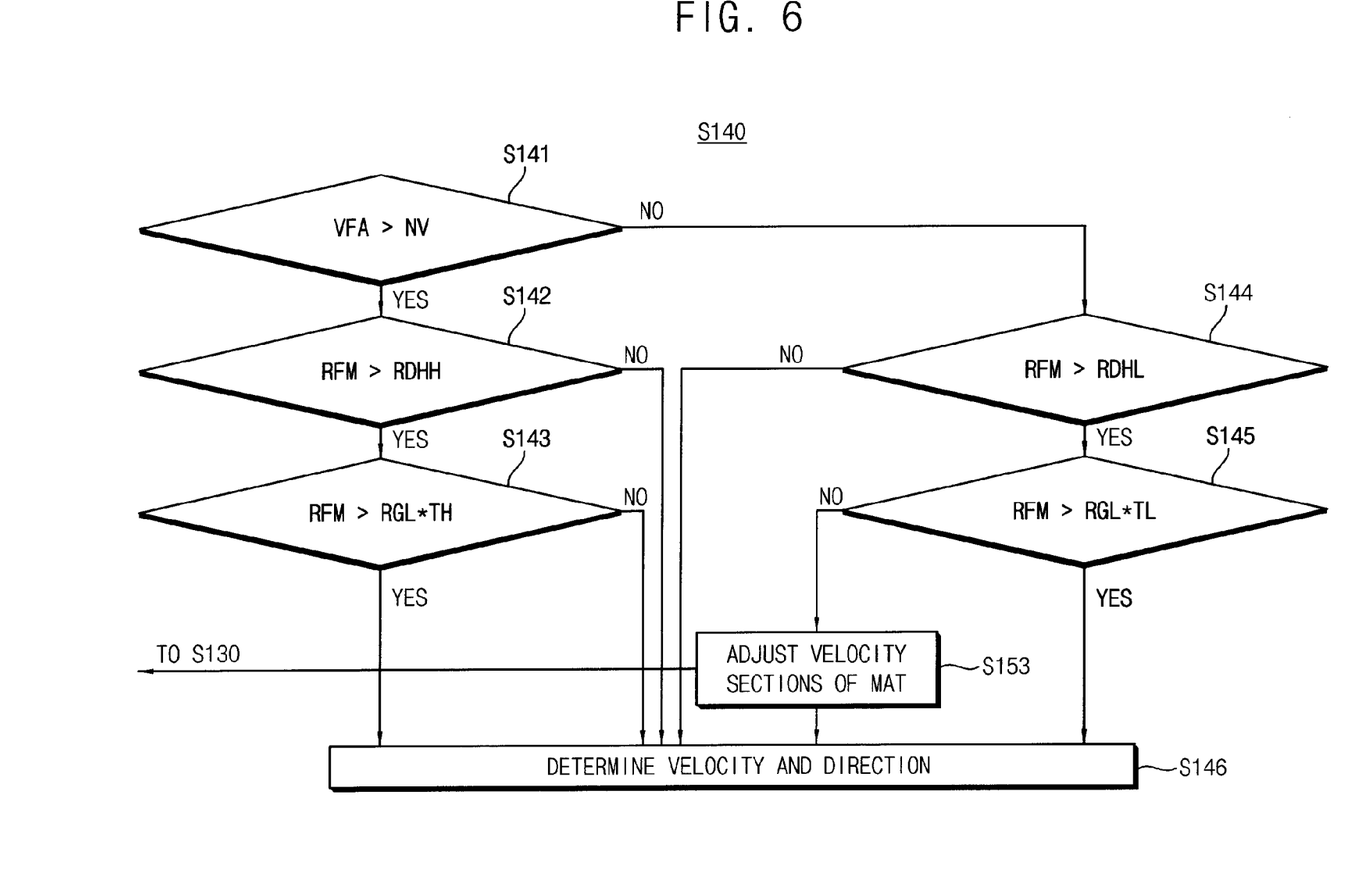
FIG. 6 is a flow chart illustrating determining motion of a subject based on the motion analysis table, according to an exemplary embodiment.

FIG. 6 is a flow chart illustrating determining the motion of the subject based on the motion analysis table included in the flow chart of FIG. 1, according to an exemplary embodiment.

Referring to FIG. 6, a first cell refers to a cell in the motion analysis table 300 having the highest frequency. To determine the motion of the subject, a frame average velocity VFA and a lower boundary velocity NV of a normal motion are compared in step S141.

When the frame average velocity VFA is greater than the lower boundary velocity NV of the normal motion (S141: YES), a frequency RFM of the first cell and a first critical frequency RDHH according to a fast motion velocity are compared in step S142. Comparing the frequency RFM of the first cell and the first critical frequency RDHH according to the fast motion velocity (S142) determines whether or not the first cell is a dominant cell in the motion analysis table 300 based on the first critical frequency RDHH, which is an absolute value.

When the frequency RFM of the first cell is greater than the first critical frequency RDHH according to the fast motion velocity (S142: YES), it is determined that the first cell is a dominant cell in the motion analysis table 300. When the frequency RFM of the first cell is less than the first critical frequency RDHH according to the fast motion velocity (S142: NO), it is determined that the first cell is not a dominant cell in the motion analysis table 300, in which case the subject is determined as background. Accordingly, the direction of the subject is not determined, and the velocity of the subject is determined to be 0 in step S146 of determining the velocity and the direction of the subject.

When the frequency RFM of the first cell is greater than the first critical frequency RDHH according to the fast motion velocity (S142: YES), the frequency RFM of the first cell is then compared to a product of a majority baseline ratio TH and first or second frequency RGL in step S143. The majority baseline ratio TH corresponds to the fast motion velocity. The first frequency is a frequency of a second cell having a lowest frequency among cells which correspond to the velocity section of the first cell in the motion analysis table 300. The second frequency is a frequency of a third cell having an opposite direction to a direction of the first cell among cells which correspond to the velocity section of the first cell in the motion analysis table 300. In particular, the first and second cells are in the same velocity section, and are not in the same direction section. The second cell has the lowest frequency among cells which correspond to the velocity section of the first cell in the motion analysis table 300. The first and third cells are in the same velocity section, and the third cell has an opposite direction to a direction of the first cell.

When the frequency RFM of the first cell is greater than the product of the majority baseline ratio TH and the first or second frequency RGL (S143: YES), it is determined that the frequency RFM of the first cell is far greater than the first or second frequency RGL, and the direction of the subject is determined as a representative direction of the direction section of the first cell in step S146 of determining the velocity and the direction of the subject. The representative direction may be an average direction of the direction section, or the representative direction may be a median direction of the direction section.

When the frequency RFM of the first cell is less than the product of the majority baseline ratio TH and the first or second frequency RGL (S143: NO), it is determined that the frequency RFM of the first cell is not far greater than the first or second frequency RGL, and the subject is determined as background. Accordingly, the direction of the subject is not determined, and the velocity of the subject is determined to be 0 in step S146 of determining the velocity and the direction of the subject.

Comparing the frequency RFM of the first cell and the product of the majority base one TH and the first or second frequency RGL (S143) determines whether or not the first cell is a dominant cell in the motion analysis table 300 based on the first or the second frequency RGL, which is a relative value.

When the frame average velocity VFA is less than the lower boundary velocity NV of the normal motion (S141: NO), the frequency RFM of the first cell and a second critical frequency RDHL according to a slow motion velocity are compared in step S144. Comparing the frequency RFM of the first cell and the second critical frequency RDHL according to the slow motion velocity (S144) determines whether or not the first cell is a dominant cell in the motion analysis table 300 based on the critical frequency RDDL, which is an absolute value.

When the frequency RFM of the first cell is greater than the second critical frequency RDHL according to the slow motion velocity (S144: YES), it is determined that the first cell is a dominant cell in the motion analysis table 300. When the frequency RFM of the first cell is less than the second critical frequency RDHL according to the slow motion velocity (S144: NO), it is determined that the first cell is not a dominant cell in the motion analysis table 300, and the subject is determined as background. Accordingly, the direction of the subject is not determined, and the velocity of the subject is determined to be 0 in step S146 of determining the velocity and the direction of the subject.

When the frequency RFM of the first cell is greater than the second critical frequency RDHL according to the slow motion velocity (S144: YES), the frequency RFM of the first cell is compared to a product of a majority baseline ratio TL and first or second frequency RGL in step S145. The majority baseline ratio TL corresponds to the slow motion velocity. The first frequency is a frequency of a second cell having a lowest frequency among cells which correspond to the velocity section of the first cell in the motion analysis table 300. The second frequency is a frequency of a third cell having an opposite direction to the direction of the first cell among cells which correspond to the velocity section of the first cell in the motion analysis table 300.

When the frequency RFM of the first cell is greater than the product of the majority baseline ratio TL and the first or second frequency RGL (S145: YES), it is determined that the frequency RFM of the first cell is far greater than the first or second frequency RGL, and the direction of the subject is determined as a representative direction of the direction section of the first cell in step S146 of determining the velocity and the direction of the subject. The representative direction may be an average direction of the direction section, or the representative direction may be a median direction of the direction section.

When the frequency RFM of the first cell is less than the product of the majority baseline ratio TL and the first or second frequency RGL (S145: NO), it is determined that the frequency RFM of the first cell is not far greater than the first or second frequency RGL, and the subject is determined as background. Accordingly, the intervals of the velocity sections of the motion analysis table are adjusted in step S153. Also, the direction of the subject is not determined, and the velocity of the subject is determined to be 0 in step S146 of determining the velocity and the direction of the subject.

Comparing the frequency RFM of the first cell and the product of the majority baseline ratio TL and the first or second frequency RGL (S145) determines whether or not the first cell is a dominant cell in the motion analysis table 300 based on the first or the second frequency RGL, which is a relative value.

In the step of adjusting the intervals of the velocity sections of the motion analysis table (S153), the intervals of the velocity sections V1 through VN of the motion analysis table 300 may be adjusted so that the frequency RFM of the first cell becomes greater than the product of the majority base line ratio TL and the first or second frequency RGL. In an exemplary embodiment, in the step of adjusting the intervals of the velocity sections of the motion analysis table (S153), a portion of the intervals of the velocity sections V1 through VN of the motion analysis table 300 may be adjusted. In another exemplary embodiment, in the step of adjusting the intervals of the velocity sections of the motion analysis table (S153), all of the intervals of the velocity sections V1 through VN of the motion analysis table 300 may be adjusted.

The steps included in the flow chart of FIG. 2 and the steps included in the flow chart of FIG. 6 may be mapped as follows.

Determining the motion direction of the subject as the representative direction of the direction section of the first cell based on the frame average velocity and the motion analysis table (S151) may be performed when the frequency RFM of the first cell is greater than the first or second critical frequency RDHH or RDHL (S142: YES or S144: YES), and the frequency RFM of the first cell is greater than the product of the majority baseline ratio TH or TL and the first or second frequency RGL (S143: YES or S145: YES).

Determining the motion velocity of the subject based on the frame average velocity and the motion analysis table (S152) may determine the motion velocity of the subject as a first normal motion velocity (S146) in a first case when the frame average velocity VFA is greater than the lower boundary velocity NV of the normal motion (S141: YES), the frequency RFM of the first cell is greater than the first critical frequency RDHH according to the fast motion velocity (S142: YES), and the frequency RFM of the first cell is greater than the product of the majority baseline ratio TH and the first or second frequency RGL (S143: YES). In an exemplary embodiment, the first normal motion velocity may be represented as a fast motion velocity or a natural and fast motion velocity.

Determining the motion velocity of the subject based on the frame average velocity and the motion analysis table (S152) may determine the motion velocity of the subject as a second normal motion velocity (S146) in a second case when the frame average velocity VFA is less than the lower boundary velocity NV of the normal motion (S141: NO), the frequency RFM of the first cell is greater than the second critical frequency RDHL according to the slow motion velocity (S144: YES), and the frequency RFM of the first cell is greater than the product of the majority baseline ratio TL and the first or second frequency RGL (S145: YES). In an exemplary embodiment, the second normal motion velocity may be represented as a slow motion velocity or a very slow motion velocity.

Determining the motion velocity of the subject based on the frame average velocity and the motion analysis table (S152) may determine the motion velocity of the subject to be 0 (and the subject as background) in any case other than one of the first and second cases, described above.

Determining the motion of the subject based on the motion analysis table (S140) may include adjusting the intervals of the velocity sections of the motion analysis table (S153) when the frame average velocity VFA is less than the lower boundary velocity NV of the normal motion (S141: NO), the frequency RFM of the first cell is greater than the second critical frequency RDHL according to the slow motion velocity (S144: YES), and the frequency RFM of the first cell is less than the product of the majority baseline ratio TL and the first or second frequency RGL (S145: NO).

Figure 7:
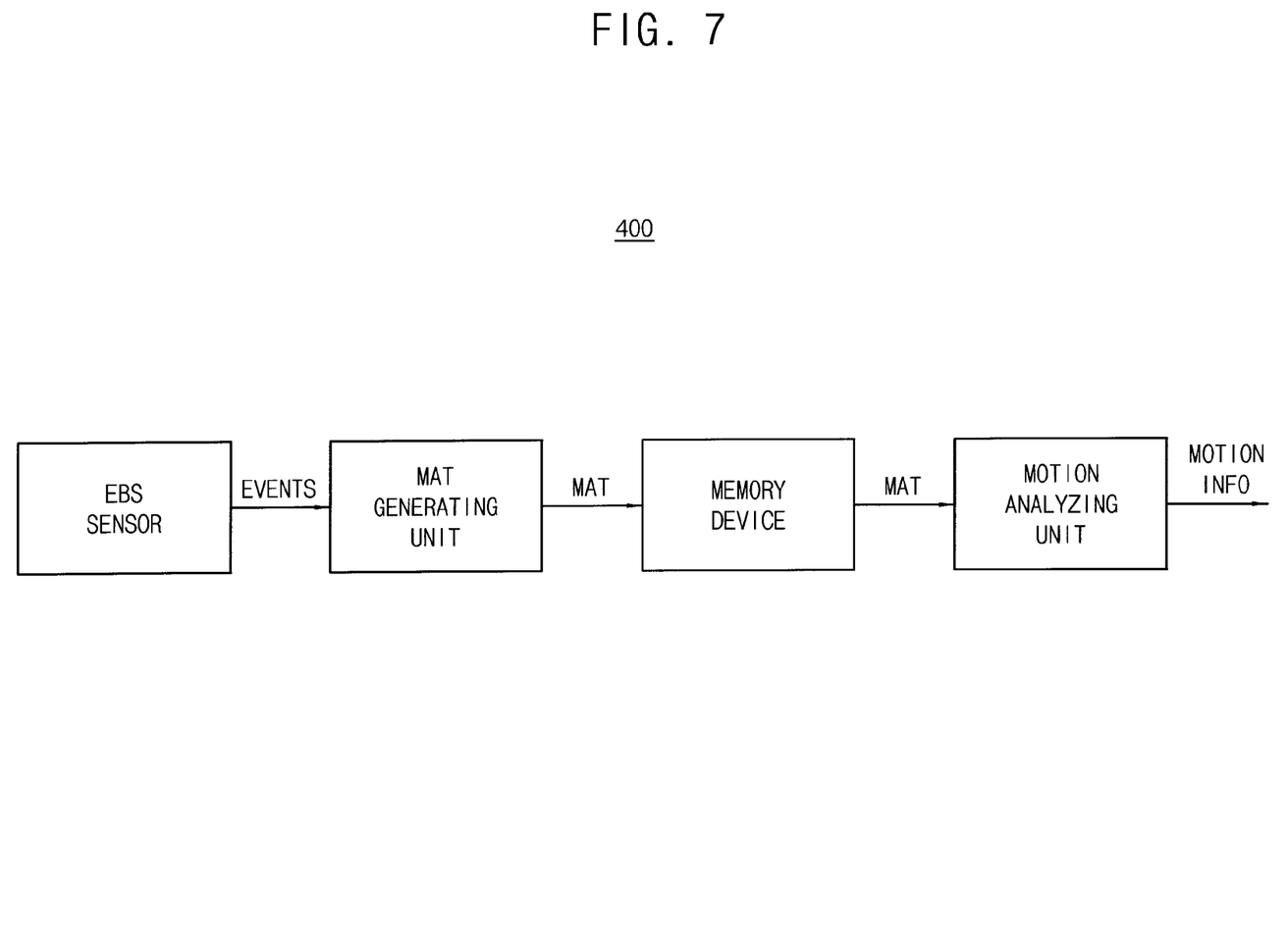
FIG. 7 is a block diagram illustrating a subject motion analyzer system, according to an exemplary embodiment.

FIG. 7 is a block diagram illustrating a subject motion analyzer, according to an exemplary embodiment.

Referring to FIG. 7, the subject motion analyzer system 400 includes an event-based sensor EBS SENSOR, a motion analysis table generating unit MAT GENERATING UNIT, a memory device MEMORY DEVICE, and a motion analyzing unit MOTION ANALYZING UNIT.

The event-based sensor EBS SENSOR is configured to generate multiple events EVENTS corresponding to luminance changes of a subject. The events EVENTS may be understood with reference to FIG. 3, as discussed above.

The motion analysis table generating unit MAT GENERATING UNIT is configured to calculate velocities and directions of the events EVENTS, and to generate a motion analysis table MAT based on the calculated velocities and directions of the event EVENTS. The motion analysis table MAT has an X axis classified into multiple velocity sections and a Y axis classified into multiple direction sections, and includes multiple cells representing frequencies of events corresponding to combinations of the velocity sections and the direction sections. Calculating the velocities of the events EVENTS and the directions of the events EVENTS may be understood with reference to FIG. 4, as discussed above. Generating the motion analysis table MAT may be understood with reference to FIG. 5, as discussed above.

The motion analysis table MAT, generated by the motion analysis table generating unit MAT GENERATING UNIT, is stored to the memory device MEMORY DEVICE. The motion analysis table MAT may be loaded from the memory device MEMORY DEVICE.

The motion analyzing unit MOTION ANALYZING UNIT is configured to output motion information MOTION INFO after determining the motion of the subject based on the motion analysis table MAT loaded from the memory device MEMORY DEVICE. Determining the motion of the subject may be understood with reference to FIG. 6, as discussed above.

The motion analysis table generating unit MAT GENERATING UNIT and the motion analyzing unit MOTION ANALYZING UNIT may be embodied as hardware, software, or a combination thereof.

Figure 8:
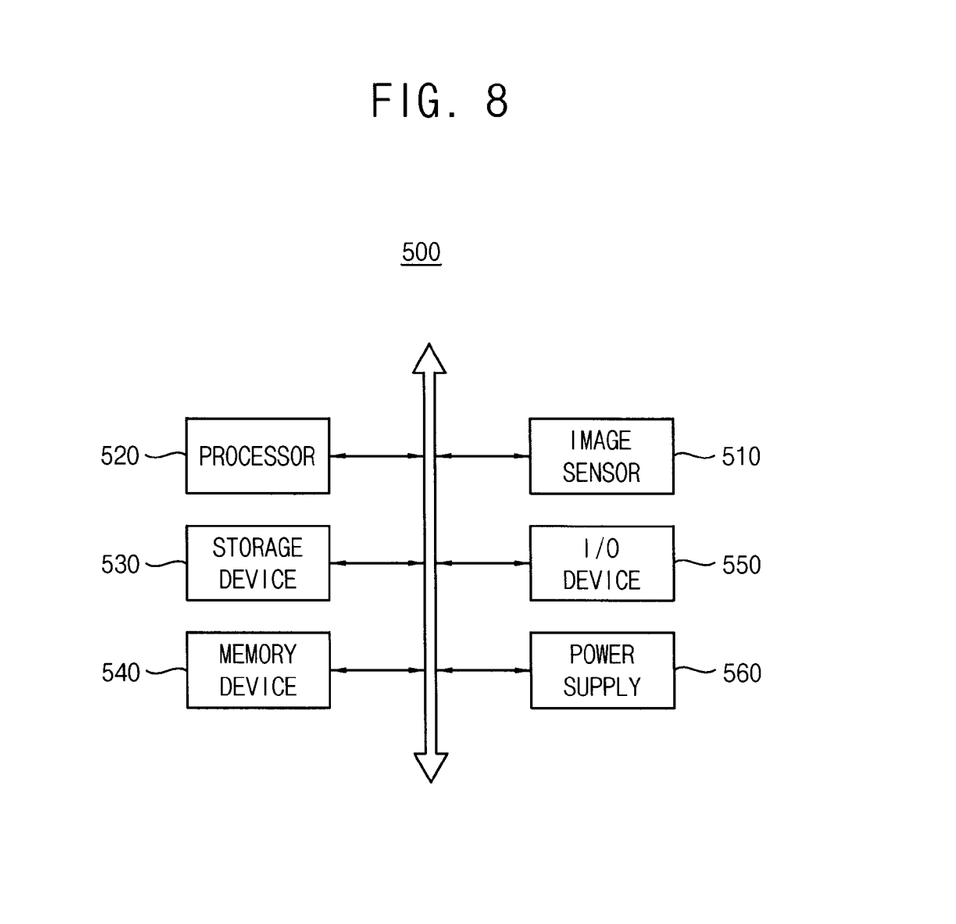
FIG. 8 is a block diagram illustrating a computing system, according to exemplary embodiment.

FIG. 8 is a block diagram illustrating a computing system, according to exemplary embodiment.

Referring to FIG. 8, a computing system 500 includes an image sensor 510, a processor 520 and a storage device 530. The image sensor 510 is configured to generate a digital signal corresponding to incident light. The storage device 530 is configured to store the generated digital signal. The processor 520 is configured to control operations of the image sensor 510 and the storage device 530.

In the depicted embodiment, the computing system 500 further includes a memory device 540, an input/output device 550 and a power supply 560. Although not illustrated in FIG. 8, the computing system 500 may further include ports that communicate with a video card, a sound card, a memory card, a universal serial bus (USB) device, or other electronic devices.

The processor 520 is configured to perform various calculations or tasks. According to various embodiments, the processor 520 may be a microprocessor or a central processing unit (CPU), for example. The processor 520 may communicate with the storage device 530, the memory device 540 and the input/output device 550 via an address bus, a control bus and/or a data bus. In various exemplary embodiments, the processor 520 may be coupled to an extended bus, such as a peripheral component interconnection (PCI) bus, for example.

The storage device 530 may include a non-volatile memory device such as a flash memory device, a solid state drive (SSD), a hard disk drive (HDD), a compact disk read-only memory (CD-ROM) drive, etc.

The memory device 540 is configured to store data required for operation of the computing system 500. The memory device 540 may be a dynamic random access memory (DRAM), a static random access memory (SRAM), or a non-volatile memory, such as an erasable programmable read-only memory (EPROM), an electrically erasable programmable read-only memory (EEPROM), or a flash memory, for example.

The input/output device 550 may include a keyboard, a mouse, a printer, and/or a display device, for example. The power supply 560 is configured to supply operational power.

The image sensor 510 may be connected to the processor 520 through one or more of the above mentioned buses or other communication links to communicate with the processor 520. In various embodiments, the image sensor 510 is an event sensor, such as the event sensor described in the flow chart of FIG. 1. The steps of the flow chart in FIG. 1 may be performed in the processor 520. The motion analysis table included in the flow chart of FIG. 1 may be stored in the memory device 540.

The image sensor 510 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

According to exemplary embodiments, the image sensor 510 may be integrated with the processor 520 in one chip, or the image sensor 510 and the processor 520 may be implemented as separate chips.

The computing system 500 may be any computing system using an image sensor. For example, the computing system 500 may include a digital camera, a mobile phone, a smart phone, a portable multimedia player (PMP), a personal digital assistant (PDA), and the like.

Figure 9:
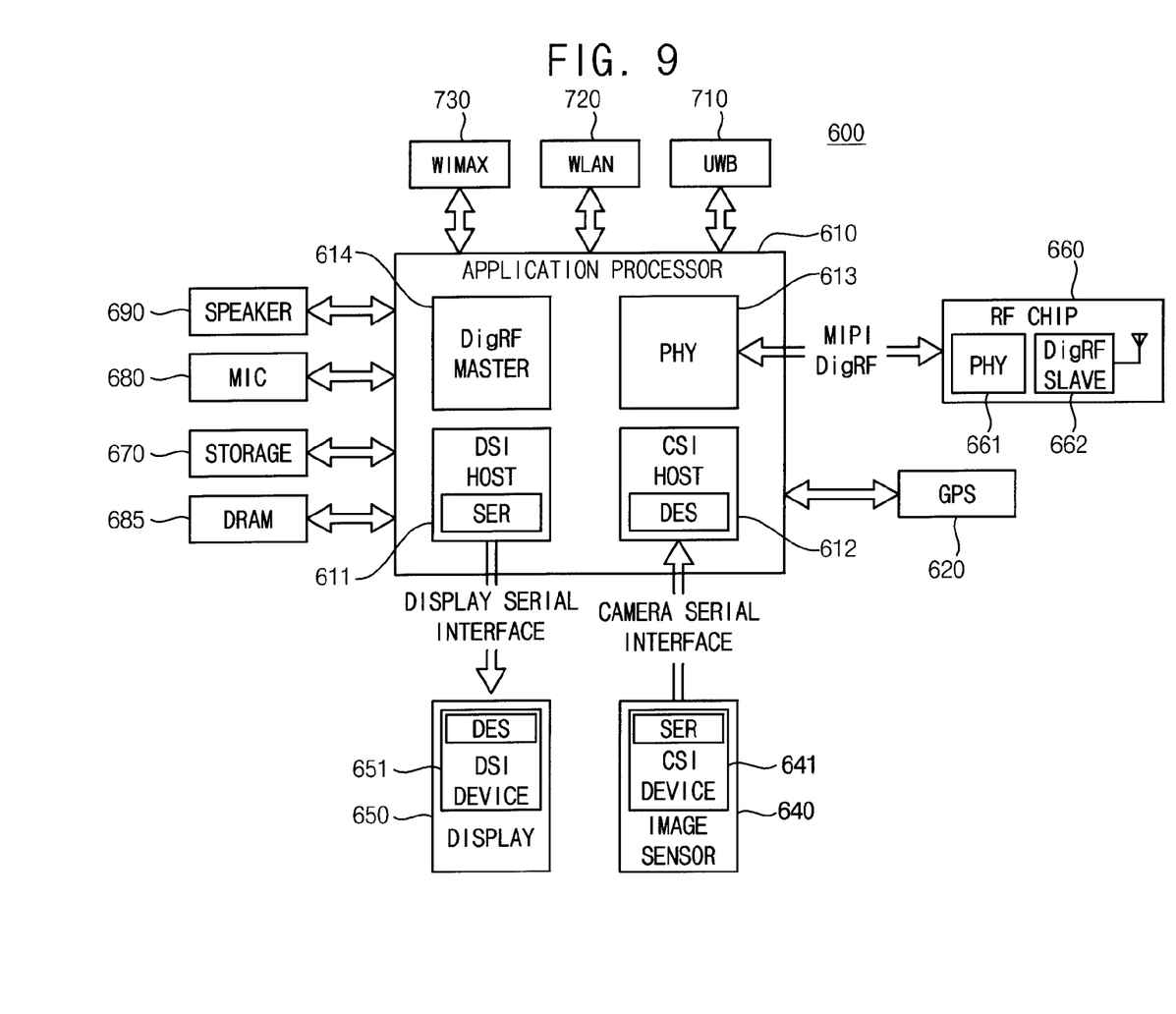
FIG. 9 is a block diagram illustrating an interface included in the computing system of FIG. 8, according to an exemplary embodiment.

FIG. 9 is a block diagram illustrating an interface included in the computing system of FIG. 8, according to an exemplary embodiment.

Referring to FIG. 9, a computing system 600 may be implemented by a data processing device (e.g., a cellular phone, a personal digital assistant, a portable multimedia player, a smart phone) that uses or supports a mobile industry processor interface (MIPI). In the depicted embodiment, the computing system 600 includes at least an application processor 610, an image sensor 640, and a display device 650.

A CSI host 612 of the application processor 610 is configured to perform serial communications with a CSI device 641 of the image sensor 640 via a camera serial interface (CSI). In various embodiments, the CSI host 612 may include a deserializer (DES), and the CSI device 641 may include a serializer (SER), for example. A DSI host 611 of the application processor 610 is configured to perform serial communications with a DSI device 651 of the display device 650 via a display serial interface (DSI). In various embodiments, the DSI host 611 may include a serializer (SER), and the DSI device 651 may include a deserializer (DES), for example.

The image sensor 640 may be an event sensor as described above with reference to the flow chart of FIG. 1. The steps of the flow chart in FIG. 1 may be performed by the application processor 610. The motion analysis table included in the flow chart of FIG. 1 may be stored in a DRAM device 685.

The computing system 600 may further include a radio frequency (RF) chip 660 for enabling communications with the application processor 610. A physical layer (PHY) 613 of the computing system 600 and a physical layer (PHY) 661 of the RF chip 660 may perform data communications based on a MIPI DigRF, for example. The application processor 610 may further include a DigRF MASTER 614 that controls the data communications according to the MIPI DigRF of the PHY 661, and the RF chip 660 may further include a DigRF SLAVE 662 controlled by the DigRF MASTER 614.

The computing system 600 may further include a global positioning system (GPS) 620, storage 670, a MIC 680, the DRAM device 685, and a speaker 690. In addition, the computing system 600 may perform communications by various means, including an ultra wideband (UWB) 710, a wireless local area network (WLAN) 720, and/or a worldwide interoperability for microwave access (WIMAX) 730, for example. However, the structure and the interface of the computing system 600 are not limited thereto.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative, and that modifications to the disclosed exemplary embodiments, as well as other exemplary embodiments, are intended to be included within the scope of the appended claims.

What is claimed is:

1. A method of determining motion of a subject, the method comprising:
generating a plurality of events by an event-based sensor in response to changes in luminance of the subject detected based on light received at pixels;
calculating velocities of the events and directions of the events based on correlating information from at least two pixels for each event;
generating a motion analysis table comprising an X axis classified into a plurality of velocity sections that represent different velocities, a Y axis classified into a plurality of direction sections that represent different directions, and a plurality of cells each representing a frequency of events corresponding to a different one of a plurality of combinations of the different velocities and the different directions; and determining a motion of the subject based on a relative frequency of a combination of velocity and direction for a cell in comparison to other combinations for other cells in the motion analysis table.

2. The method of claim 1, wherein determining the motion of the subject further comprises:
determining a motion direction of the subject as a representative direction of a direction section of a first cell, which has a highest frequency in the motion analysis table, based on a frame average velocity and the motion analysis table.

3. The method of claim 2, wherein determining the motion direction of the subject as the representative direction of the direction section of the first cell based on the frame average velocity and the motion analysis table is performed when a frequency of the first cell is greater than a critical frequency of the motion analysis table, and the frequency of the first cell is greater than a product of a majority baseline ratio and one of a first frequency and a second frequency,
wherein the first frequency is a frequency of a second cell having a lowest frequency among cells corresponding to a velocity section of the first cell in the motion analysis table, and
wherein the second frequency is a frequency of a third cell having an opposite direction to a direction of the first cell among cells which correspond to the velocity section of the first cell in the motion analysis table.

4. The method of claim 1, wherein determining the motion of the subject further comprises:
determining a motion velocity of the subject based on a frame average velocity and the motion analysis table.

5. The method of claim 4, wherein determining the motion velocity of the subject based on the frame average velocity and the motion analysis table determines the motion velocity of the subject as a first normal motion velocity in a first case in which the frame average velocity is greater than a lower boundary velocity of a normal motion, a frequency of a first cell, which has a highest frequency in the motion analysis table, is greater than a first critical frequency of the motion analysis table, and the frequency of the first cell is greater than a product of a first majority baseline ratio and one of a first frequency and a second frequency,
wherein the first frequency is a frequency of a second cell having a lowest frequency among cells which correspond to a velocity section of the first cell in the motion analysis table, and
wherein the second frequency is a frequency of a third cell having an opposite direction to a direction of the first cell among cells which correspond to the velocity section of the first cell in the motion analysis table.

6. The method of claim 5, wherein determining the motion velocity of the subject based on the frame average velocity and the motion analysis table determines the motion velocity of the subject as a second normal motion velocity in a second case, in which the frame average velocity is less than the lower boundary velocity of the normal motion, the frequency of the first cell is greater than a second critical frequency of the motion analysis table, and the frequency of the first cell is greater than a product of a second majority baseline ratio and one of the first frequency and the second frequency.

7. The method of claim 6, wherein determining the motion velocity of the subject based on the frame average velocity and the motion analysis table determines the motion velocity of the subject to be 0 and that the subject is background in a case other than one of the first and second cases.

8. The method of claim 4, wherein determining the motion velocity of the subject based on the frame average velocity and the motion analysis table comprises:
adjusting intervals of the velocity sections of the motion analysis table when a frame average velocity is less than a lower boundary velocity of a normal motion, a frequency of a first cell, which has a highest frequency in the motion analysis table, is greater than a critical frequency of the motion analysis table, and the frequency of the first cell is less than a product of a majority baseline ratio and one of a first frequency and a second frequency,
wherein the first frequency is a frequency of a second cell having a lowest frequency among cells which correspond to a velocity section of the first cell in the motion analysis table, and
wherein the second frequency is a frequency of a third cell having an opposite direction to a direction of the first cell among cells which correspond to the velocity section of the first cell in the motion analysis table.

9. The method of claim 8, wherein adjusting the intervals of the velocity sections of the motion analysis table adjusts a portion of the intervals of the velocity sections of the motion analysis table.

10. The method of claim 8, wherein adjusting the intervals of the velocity sections of the motion analysis table adjusts all of the intervals of the velocity sections of the motion analysis table.

11. The method of claim 8, wherein generating the motion analysis table and determining the motion of the subject based on the motion analysis tables are performed again after adjusting the intervals of the velocity sections of the motion analysis table.

12. The method of claim 1, wherein each of the events includes coordinate information, time information, and polarity information.

13. The method of claim 12, wherein the polarity information is one of positive polarity information and negative polarity information.

14. The method of claim 12, wherein calculating the velocities of the events and the directions of the events comprises:
calculating a velocity of a first event and a direction of the first event based on the first event and a second event, the first event being generated by an event sensing unit corresponding to a first pixel and the second event being generated by another event sensing unit corresponding to a second pixel located around the first pixel.

15. The method of claim 14, wherein the second pixel is located within a window including the first pixel and N pixels located around the first pixel.

16. A subject motion determining system, comprising:
an event-based sensor configured to generate a plurality of events in response to changes in luminance of a subject detected based on light received at pixels;
a motion analysis table (MAT) generating unit configured to calculate velocities of the events and directions of the events based on correlating information from at least two pixels for each event, and to generate a motion analysis table comprising an X axis classified into a plurality of velocity sections that represent different velocities, a Y axis classified into a plurality of direction sections that represent different directions, and a plurality of cells each representing a frequency of events corresponding to a different one of a plurality of combinations of the different velocities and the different directions; and a motion analyzing unit configured to determine a motion of the subject based on a relative frequency of a combination of velocity and direction for a cell in comparison to other combinations for other cells in the MAT.

17. The system of claim 16, further comprising:
a memory device configured to store the motion analysis table generated by the MAT generating unit, the motion analyzing unit loading the motion analysis table from the memory device for determining the motion of the subject.

18. The system of claim 16,
wherein a frequency of each cell in the motion analysis table is a ratio of a number of all events and the number of events having a velocity within the velocity section corresponding to the cell and a direction within the direction section corresponding to the cell.

19. The system of claim 16, wherein the motion analyzing unit determines a motion direction of the subject by determining a motion direction of the subject as a representative direction of a direction section of a first cell based on a frame average velocity and the motion analysis table, the first cell having a highest frequency among the plurality of cells in the motion analysis table.

20. The system of claim 16, wherein the motion analyzing unit determines a motion velocity of the subject based on comparison of a frame average velocity with a lower boundary velocity, comparison of the frequency of a first cell with one of a first or second critical frequency, and comparison of the frequency of the first cell with a product of a majority baseline ratio and one of a first frequency and a second frequency, wherein the first frequency is a frequency of a second cell having a lowest frequency among cells corresponding to a velocity section of the first cell in the motion analysis table, and the second frequency is a frequency of a third cell having an opposite direction to a direction of the first cell among cells which correspond to the velocity section of the first cell in the motion analysis table.

\* \* \* \* \*